FM RECEIVER FOR RADIATION PATTERN DETERMINING APPARATUS

[45] Feb. 15, 1972
[15] 3,643,166

[72] Inventors: Thomas W. McCurnin; Lloyd J. Perper, both of Tucson, Ariz.

[73] Assignee: The United States of America as represented by the Secretary of the Navy

[22] Filed: Mar. 12, 1970

[21] Appl. No.: 26,465

Related U.S. Application Data

[62] Division of Ser. No. 773,451, Nov. 5, 1968.

[52] U.S. Cl. ........................ 325/344, 35/1, 325/29, 325/67, 325/346, 340/147 F
[51] Int. Cl. .................................................. H04b 1/16
[58] Field of Search ............ 325/67, 344, 346, 349, 363; 329/112; 35/1; 340/147 F, 207 R

[56] References Cited

UNITED STATES PATENTS

| | | | |
|---|---|---|---|
| 2,977,538 | 3/1961 | Secretan | 325/344 |
| 3,541,449 | 11/1970 | Broderick et al. | 325/344 |
| 3,037,079 | 5/1962 | Crafts | 325/320 X |
| 3,267,461 | 8/1966 | Harmon | 325/344 |
| 3,293,777 | 12/1966 | Shaw et al. | 35/1 |

Primary Examiner—Benedict V. Safourek
Attorney—Raymond I. Tompkins and Charles D. B. Curry

[57] ABSTRACT

A simulation system including a control device, a master transmitter, a plurality of slave transmitters and a plurality of receivers. The master and slave transmitters are physically spaced apart and their transmission signals form a hyperbolic grid network. The receivers are positioned within the hyperbolic grid network and process the signals from the master and slave transmitters to simulate dose and dose rate of a simulated detonation that takes place in the hyperbolic grid network. The master and slave transmitters operate at different modulation frequencies to identify receiver quadrants and to provide desired resolution. The receivers are controlled by control signals from the master transmitter to compare and remember the phase difference between oppositely positioned transmitters for determining position and dose at each receiver within the hyperbolic grid.

3 Claims, 3 Drawing Figures

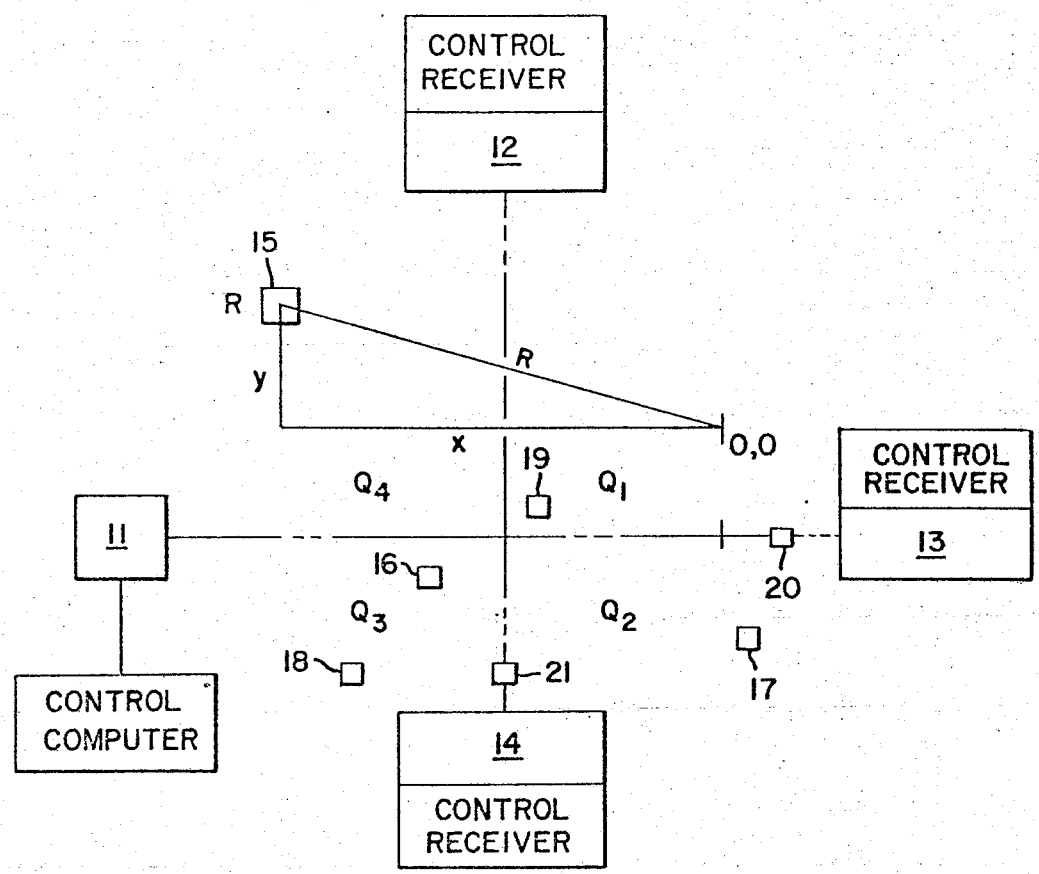
FIG_1

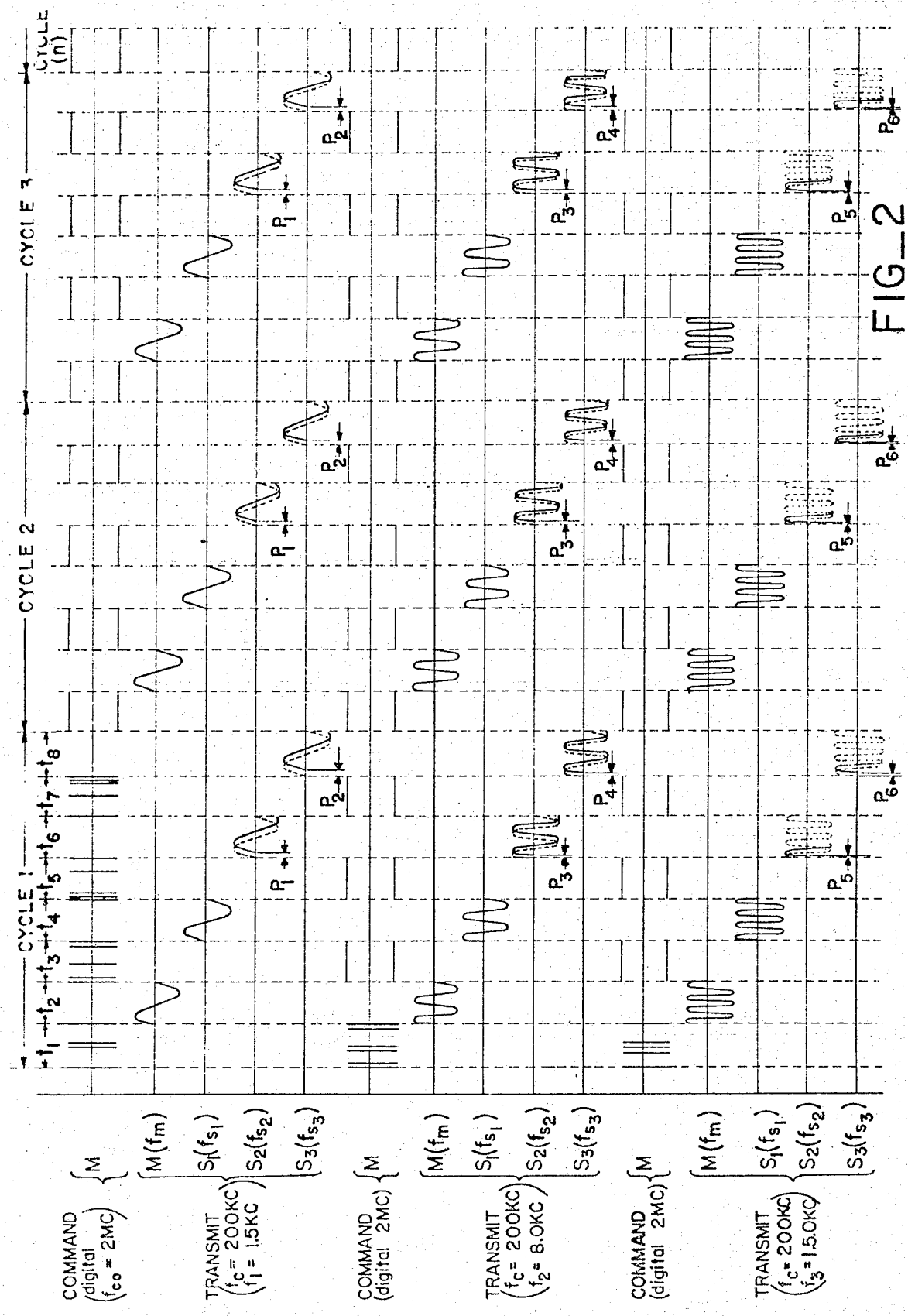
FIG_2

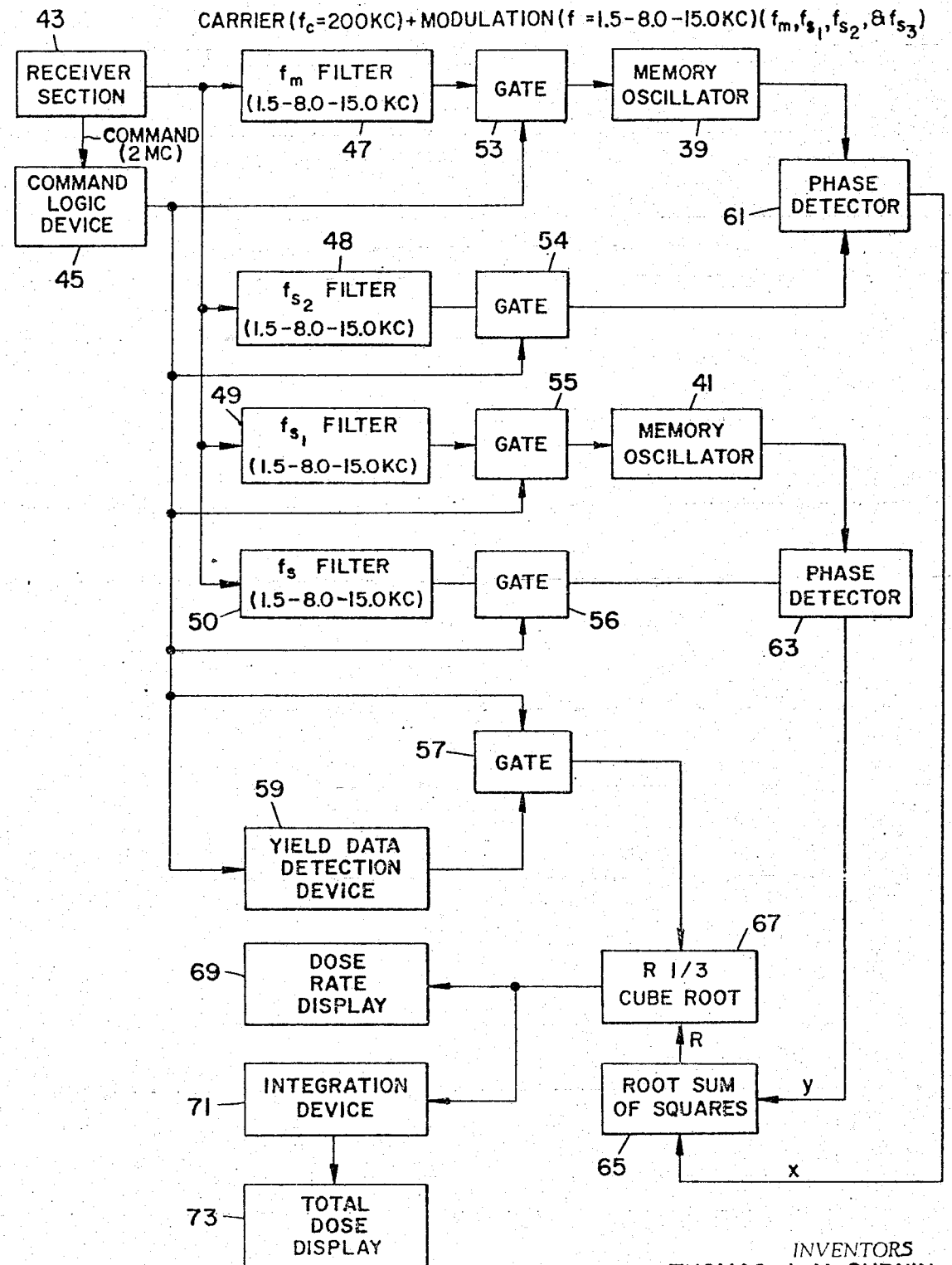
FIG_3

FM RECEIVER FOR RADIATION PATTERN DETERMINING APPARATUS

This application is a division of application Ser. No. 773,451, filed Nov. 5, 1968.

The invention described herein may be manufactured and used by or for the Government of the United States of America for governmental purposes without the payment of any royalties thereon or therefor.

To have an effective radiation simulation system it is necessary to have accurate position fixing. Due primarily to radio wave propagation loss uncertainty, it has been found that devices operating on the principle of radio frequency field intensity do not provide a sufficiently accurate basis for many applications of radiation simulation. Therefore, if radio frequency energy is to be used to provide a basis for this simulation, some other characteristic of the propagated wave must be utilized. It has been found that the velocity of propagation of the transmitted radio signal can provide an accurate basis for the simulation of radiation environment.

In accordance with the present invention a system having an accurate basis has been provided that employs the principle of constant velocity of electromagnetic wave propagation.

The present invention employs a master transmitter, a plurality of slave transmitters, a plurality of receivers and a control device. The master transmitter operates in both the control mode and in the simulation mode. The system employs two pairs of transmitters where a first pair comprises the master transmitter (when operating in the simulation mode) and a slave transmitter and a second pair comprises two slave transmitters. A square field network is set up where the first pair (master and slave) of transmitters are positioned at opposite ends of one diagonal of the square field and the second pair (two slaves) are positioned at opposite ends of the other diagonal of the square field. The diagonal distance between transmitters may be of the order of one hundred miles. The plurality of receivers are carried by the troops within the area formed by the square field network. The slave transmitters also include receivers for receiving coded control signals from the master transmitter when it is operating in the control mode.

The control device controls the master transmitter during the control and simulation modes of operation. During the simulation mode of operation of the master transmitter the control device controls the simulation transmission signal of the master transmitter that is transmitted to the plurality of field receivers. During the control mode of operation of the master transmitter the control device controls the coded transmission signal of the master transmitter that is received by the receiver sections of the slave transmitters and by the field receivers that are carried by the troops in the grid network.

The purpose of the slave transmitter coding is to properly synchronize the simulation transmissions of the master and slave transmitters. By appropriate coding a hyperbolic grid network is established by changing the relative phases of the simulation transmissions of each of the pairs of transmitters.

The purpose of the field receiver coding is to provide receiver control information for receiving the simulation signals and pertinent nuclear information such as nuclear yield eccentricity and axis angle. Since time ans phase of the simulation transmitted signal are interdependent, the hyperbolic lines forming the grid network represent constant phase difference between the pairs of transmitter signals. Both transmitters of each pair are operated at the same frequency and constant phase-difference will also represent constant time-difference and constant distance-difference. By controlling the initial phase of the transmitters in each pair, the zero-phase difference lines can be caused to intersect at the center point of a simulated radiation field.

In accordance with the present invention this zero-zero reference point can be varied within the area covered by the hyperbolic grid by the correct choice of transmitter signal phases. This is achieved by causing the phase of one of the transmitters of each of the pairs to lead or lag the phase of the other transmitters in their respective pairs. For example, a zero-zero reference point may be established in the first quadrant by having the phase of one of the transmitters in the first pair lead the other transmitter in the first pair and the phase of one of the transmitters in the second pair lead the other transmitter in the second pair. The zero-zero reference point may be established in a second quadrant by causing the phase of the previously leading transmitter in the first pair to now lag the other transmitter in that first pair. The zero-zero reference point may be established in a third quadrant by causing the phase of previously leading transmitters in the second pair to now lag the other transmitter in that second pair. Finally, the zero-zero reference point may be established in the fourth quadrant by having the phase of both of the previously leading transmitters (first quadrant) to now lag the other transmitters. The degree by which the signals lead or lag will determine the particular position of the zero-zero reference point within their respective quadrants. In this manner a highly flexible simulation system is established which makes it possible to move the zero-zero reference point to any position within the hyperbolic grid network without the necessity of physically moving the transmitter sites.

In accordance with the present invention the simulation exercises are performed by the field receivers receiving and processing the simulation signals from the transmitters. Such the time and phase of the transmitted pairs of signals are interdependent and since the velocity of propagation is constant and is known, the phase difference of the pairs of transmission will determine distance form the zero-zero reference point in the hyperbolic and rectangular coordinate system. That is, the phase difference between the signals received by the field receivers from the first pair of transmitters will represent the distance in the X-direction from the zero-zero reference point. Whereas the phase difference between the signals received by the field receivers from the second pair of transmitters will represent the distance in the Y-direction from the zero-zero reference points. Knowing the X- and Y-distances the receiver then processes these signals to determine the actual distance R in the polar coordinent system. This is performed by the receivers electronically squaring the X- and Y-values, summing these square values and taking the square root of their sum ($R=\sqrt{X^2+Y^2}$). To determine the actual simulated dose D at each receiver it is necessary for each receiver to know the yield Yi of the detonation at the zero-zero reference point. This information is transmitted to the field receivers by appropriate coded signals from the master transmitter or by the slave transmitter. Knowing the yield Yi and the distance $R$ each field receiver electronically processes this information to determine the dose D by dividing the yield Yi by the cube root of the distance (R)

$$[D = Y_i / \sqrt[3]{R}.]$$

This is because the dose is inversely propagational to the cube of the distance from the zero-zero reference point. Therefore, each set of simulation transmissions (one transmission by each of the transmitters in the first and second pairs of transmitter) will determine the dose for that set of transmissions. As many sets of transmissions may be employed as necessary depending on the time duration of maneuvers, yield, troop movement and the like. The total dose as a function of time is obtained by integrating the dose of each of the sets of simulation transmissions.

The master and slave transmitters operate at different modulation frequencies to identify receiver quadrants and to provide desired resolution. The receivers are controlled by control signals from the master transmitter to compare and remember the phase difference between oppositely positioned transmitters for determining position and dose at each receiver within the hyperbolic grid.

Other objects, advantages and novel features of the invention will become apparent from the following detailed description of the invention when considered in conjunction with the accompanying drawings wherein:

FIG. 1 is the block diagram illustrating the simulation system of the present invention;

FIG. 2 is a signal and timing diagram illustrating the operation of the simulation system of FIG. 1; and FIG. 3 is a block diagram illustrating the principle features of the field receivers used in the simulation system.

Referring to FIGS. 1 and 2, the hyperbolic simulation system of the present invention includes a master transmitter 11, a slave transmitter 12, a slave transmitter 13 and a slave transmitter 14. Each of these transmitters may operate on a carrier frequency ranging from less than about 100 kilocycles to several megacycles, for example, and a modulation frequency ranging from a few cycles to several hundred kilocycles, depending upon the distance and terrain involved and the resolution required. A low modulation frequency may be used for long distances and low resolution whereas a higher modulation frequency may be used for shorter distances and higher resolutions. As will be hereinafter described in detail, successful practice of the present invention has been achieved using modulation frequencies of 1.5, 8.0 and 15.0 kilocycles, respectively for low, intermediate and high resolution and to establish the proper quadrant and eliminate ambiguity.

The master transmitter 11 transmits in two different modes. One is the command or control mode where it transmits a control signal for controlling slave transmitters 12, 13 and 14 and receivers 15 through 21. The other is the simulation mode where it transmits a simulation signal for reception by receivers 15 through 21 that are positioned within the hyperbolic grid. This simulation signal is compared in the receivers with the simulation signal transmitted by slave transmitter 13.

Preferably the slave transmitters transmit only one type of signal. This signal is a simulation signal for reception by receivers 15 through 21 positioned within the hyperbolic grid network. That is, in receivers 15 through 21 the signal from slave transmitter 12 is compared with the signal from slave transmitter 14 and the signal from slave transmitter 13 is compared with the signal from master transmitter 11 when operating in the simulation mode.

In FIG. 2 is shown a timing and signal diagram illustrating a typical operation of the hyperbolic simulation system of the present invention. As previously described, the master transmitter operates in two different modes; first in the control mode and then in the simulation mode. The control mode of operation of master transmitter occurs during times $t_1$, $t_3$, $t_5$, and $t_7$ where it operates to control slave transmitters 12, 13 and 14 and receivers 15 through 21. This control is preferably done by digital signals at a carrier frequency of from 1 to 2 megacycles. However, it is to be understood that different types of control signals and carrier frequencies may be employed provided they are compatible with the electronics employed and the system operation.

The control signal of master transmitter 11 that occurs at time $t_1$ functions to control master transmitter 11. It should be noted that this will normally be an internal signal and need not be a transmitted signal.

The control signals generated by master transmitter 11 are dictated by the control program of control computer 25. This control program will control the following parameters, for example. First, it controls the transmitting sequence, timing and duration of simulation transmission signals of master transmitter 11 and slave transmitter 12, 13 and 14. Second, it controls the modulation frequency of master transmitter 11 and slave transmitters 12, 13 and 14. Third, it controls the phase relationship of the modulation frequency between master transmitter 11 and slave transmitter 13 and between slave transmitter 12 and slave transmitter 14. Fourth, it controls the yield and other data (e.g., wind direction) data that is transmitted to receivers 15 through 21. Fifth, it applies appropriate controls to receivers 15 through 21 for handling the signals from master transmitters 11 and slave transmitters 12, 13 and 14 and for handling the yield and other data.

Cycles 1, 2, 3 to $n$ are a series of system cycles of operation. To eliminate ambiguity of quadrant location a first low frequency modulation signal ($f_1$) is transmitted by each of master transmitter 11 and slave transmitters 12, 13 and 14. This condition is shown with the upper set of curves of FIG. 2. During time $t_1$ of cycle 1 the master transmitter transmits a digital control signal having a frequency of 2 megacycles, for example, which is used to control both the master transmitter (during transmission time $t_2$) and receivers 15 through 21. The function of the control signal on receivers 15 through 21 will be described below by reference to FIG. 3. During time $t_2$ of cycle 1 the master transmitter will transmit a simulation signal ($f_m$) having a modulation frequency of 1.5 kilocycles, for example. For purpose of illustration, the simulation signal ($f_m$) from the master transmitter is shown as a single sine wave having a time period of $t_2$. In actual practice the time $t_2$ will be preferably from about ¼ second to about 1 second depending upon the frequencies used, the characteristics of the master transmitter, the terrain, and, perhaps most important, the characteristics of receivers 15 through 21. That is, the simulation signal ($f_m$) which is transmitted from master transmitter 11 must be received and processed by receiver 15 of FIG. 3 so that its filter and memory devices may be actuated.

At time $t_3$ of cycle 1 the master transmitter transmits another digital command signal, having a frequency of 2 megacycles, for example, which is used to control both slave transmitter 12 (during transmission time $t_4$) and receivers 15 through 21. During time $t_4$ slave transmitter 12 will transmit a simulation signal ($f_{s_1}$) having a modulation frequency ($f_1$) of 1.5 kilocycles, for example, on a carrier frequency of 200 kilocycles, for example. For purposes of illustration, the modulation signal ($f_{s_1}$) from slave transmitter 12 is shown as a single sine wave having a time period of $t_4$. In actual practice the time $t_4$ will be preferably from about ¼ second to about 1 second depending especially upon the characteristics of receivers 15 through 21. With the circuit shown in FIG. 3 it has been found that the transmission time $t_4$ may be less than the transmission time $t_2$ because the transmission signal ($f_{s_1}$) is not stored in a memory oscillator (it may require several cycles of input to the oscillator to have it oscillate at the correct frequency and phase) but is processed only by the filter and phase detector. However, for purposes of illustration the time durations $t_2$ and $t_4$ are shown as being the same. It should be also noted that the digital command signal during time periods $t_1$, $t_3$, $t_5$, and $t_7$ are shown as having equal time duration respecting each other and with respect to the transmitted simulation signals. This is shown in this manner for illustrative purposes and it will be apparent to one skilled in the art that the duration of the command signals may vary substantially and will be dependent upon such factors as the amount of information that must be transmitted in a particular command signal and the type of circuitry which the command must activate in the transmitters and the receivers.

At time $t_5$ of cycle 1 the master transmitter transmits another digital command signal having a frequency of 2 megacycles, for example, which is used to control both slave transmitter 13 (during transmission time $t_6$) and receivers 15 through 21. During time $t_6$ slave transmitter 13 will transmit a simulation signal ($f_{s_2}$) having a modulation frequency ($f_1$) of 1.5 kilocycles, for example, on a carrier frequency of 200 kilocycles, for example. For purposes of illustration this modulation signal is also shown as a single sine wave having a time period of $t_{f_6}$. It should be particularly noted that the simulation signal ($f_{s_2}$) (solid lines) from slave transmitter 13 lags the signal ($f_m$) (dotted lines) from master transmitter 11 by a time or phase $p_1$. It should also be noted that the signal ($f_m$) from master transmitter occurs only during time period $t_2$; however, this signal ($f_m$) and its phase are retained and repeated in memory oscillator 39 of receiver 15 of FIG. 3. It is with respect to this memorized signal ($f_m$) that the slave signal ($f_{s_2}$) may be caused to lead the master transmitter signal ($f_m$) by an appropriate digital control signal occuring during time period $t_5$. The degree of lead or lag may be also varied by the digital control signal during time period $t_5$.

At time $t_7$ of cycle 1 the master transmitter transmits another digital command signal having a frequency of 2 megacycles, for example, which is used to control both slave transmitter 14 (during the transmission time $t_8$ of simulation signal $(f_{s_4})$) and receivers 15 through 21. During time $t_8'$ slave transmitter 14 will transmit a simulation signal $(f_{s_4})$ having a modulation frequency $(f_1)$ of 1.5 kilocycles, for example, on a carrier frequency of 200 kilocycles, for example. For purposes of illustration this modulation signal is also shown as a single sine wave having a time period $t_8$. It should be particularly noted that the slave signal $(f_{s_4})$ (solid lines) from slave transmitter 14 lags the slave signal $(f_{s_1})$ (dotted lines) from slave transmitter 12 by a time or phase $p_2$. It should be also noted that the signal $(f_{s_1})$ from slave transmitter 12 occurs only during time period $t_4$; however, this slave signal $(f_{s_1})$ and its phase are retained and repeated in memory oscillator 41 of receiver 15 of FIG. 3. It is with respect to this memorized signal $(f_{s_1})$ that the slave signal $(f_{s_4})$ lags. It should be also noted that slave signal $(f_{s_4})$ may be caused to lead the slave signal $(f_{s_1})$ by an appropriate digital control signal occuring during time period $t_7$ and the degree of lead or lag may be also varied by the digital control signal during time period $t_7$.

The cycle 1 transmissions at the modulation frequency of $f_1 = 1.5$ kc. are repeated during cycles 2 and 3 and may be repeated for $n$ cycles. The number $(n)$ of repeat cycles will be determined by several factors such as the degree of resolution required, the time required for the receivers 15 through 21 to properly record the information, and the time that this information is needed, by individuals using this information, in receivers 15 through 21.

It should be noted that the information obtained on receivers 15 through 21 at the modulation frequency $f_1 = 1.5$ kc. will be sufficient to establish the position of each of receivers 15 through 21 in their respective quadrants $Q_1$, $Q_2$, $Q_3$, and $Q_4$. For example, by using relatively low frequency $(f_1 = 1.5$ kc.) the phase lag $(p_1)$ of less than 90 degrees between $f_m$ and $f_{s_2}$ will permit the location of any receiver at any position in the X direction within quadrants $Q_3$ and $Q_4$. In like manner the phase lead $(p_1)$ of less than 90° between $f_m$ and $f_{s_2}$ will permit the location of any receiver at any position in the X direction within quadrants $Q_1$ and $Q_2$. Also a phase lag $(p_2)$ of less than 90° between $f_{s_1}$ and $f_{s_3}$ will permit the location of any receiver at any position in the Y-direction quadrants $Q_2$ and $Q_3$ and a phase lead $(p_1)$ of less than 90° between $f_{s_1}$ and $f_{s_3}$ will permit the location of any receiver at any position in the Y-direction within quadrants $Q_1$ and $Q_4$.

Therefore, the information transmitted at the modulation frequency $f_1 = 1.5$ kc. will eliminate any ambiguity of quadrant location which may exist at the higher modulation frequencies of $f_2=8.0$ kc. and $f_3=15$ kc. These frequencies are selected for pairs of transmitters (11 to 13 and 12 to 14) that are spaced apart from about 100 to about 150 miles. It will be obvious to one skilled in the art that these modulation frequencies must decrease when the transmitted spacing is increased and increased when the transmitter spacing is decreased for equivalent functioning systems.

In FIG. 2 the modulation frequency transmissions of $f_2=8.0$ kc. are the center set of curves and the modulation frequency transmissions of $f_3=15.0$ kc. are the lower set of curves. The transmissions of $f_2=8.0$ kc. will establish the approximate position of the receivers 15 through 21 in their respective quadrants after the quadrants have been established by the transmission of $f_1=1.5$ kc.

The operation and comments pertaining to the command signals $(f_m)$ and the simulation signals $f_{s_1}$, $f_{s_2}$, and $f_{s_3}$ during cycles 1, 2, 3, and $n$ for the modulation frequencies of $f_2=8.0$ kc. and $f_3=15.0$ kc. are very similar to those described above respecting the $f_1=1.5$ kc. transmission and therefore will not be repeated.

However, it should be noted that phase lag $p_3$ of $f_{s_3}$ (slave transmitter 13) is with respect to $f_m$ (master transmitter 11) and the phase lag $p_4$ of $f_{s_4}$ (slave transmitter 14) is with respect to $f_{s_2}$ (slave transmitter 12) for the intermediate modulation transmission frequencies of $f_2=8.0$ kc. Also the phase lag $p_5$ of $f_{s_3}$ (slave transmitter 13) is with respect to $f_m$ (master transmitter 11) and the phase lag $p_6$ of $f_{s_4}$ (slave transmitter 14) is with respect to $f_{s_2}$ (slave transmitter 12) for the high modulation transmission frequencies of $f_3=15.0$ kc.

The particular set of simulation problems will, in general, dictate the particular pattern and sequences of signals employed. For example, after the orientation and the approximate positions have been established at the modulation frequency of $f_1=1.5$ kc. and $f_2=8.0$ kc. then the remainder of the simulation information may be transmitted at the modulation frequency of 150.0 kc.

Referring now to FIG. 3 is illustrated a block diagram of a typical receiver, that is, any one of receivers 15 through 21, employed in the hyperbolic simulation system of the present invention. All incoming signals to receiver 15, for example, are received by receiver section 43 which is capable of handling the 2 mc. digital command signal and the modulated carrier signals. The command signal output of receiver section 43 is applied to the input of command logic device 45. The modulated carrier output of receiver section 43 is applied to the inputs of filters 47, 48, 49, and 50.

The output of command logic device 45, which may comprise a plurality of conventional flip-flop circuits, gates, clocks and the like arranged together to function as hereinafter described, is connected to the inputs of gates 53, 54, 55, 56, and 57 and to the input of yield data detection device 59. It will be understood by those skilled in the art that the output of command logic device is shown as a single line; however, in actual practice it will comprise a plurality of lines used for transferring the digital logic to each of the respective gates 53 through 57 and to the yield data detection device 59.

The outputs of filters 47, 48, 49, and 50 are respectively connected to the inputs of gates 53, 54, 55, and 56. The output of gate 53 is connected to the input of memory oscillator 39 the output of which is connected to one of the inputs of phase detector 61. The output of gate 54 is connected to the other input of phase detector 61. The output of gate 55 is connected to the input of memory oscillator 41 the output of which is connected one of the inputs of phase detector 63. The output of gate 56 is connected to the other input of phase detector 63.

The output of phase detector 61 provides the X-coordinate information (see FIG. 1) and is applied to one of the inputs of device 65. The output of phase detector 63 provides Y-coordinate information (see FIG. 1) and is applied to the other input of device 65. Device 65 functions to square each of the X- and Y-inputs, then sum these squared inputs, and then take the square root of the sum. Device 65 should also include a memory circuit since the output of phase detectors 61 and 63 are received at different times. However, an external memory could be provided by employing a memory device in one or both of the phase detectors and then simultaneously applying the outputs of phase detectors 61 and 63 to the inputs of device 65. It should be noted that the output of phase detectors 61 and 63 may be in either digital or analog format depending upon the particular needs and circuitry employed. A detailed description of the circuitry employed in phase detectors 61 and 63 and in device 65 will not be provided since many different circuits could be employed which are well known to those skilled in the art. The output of device 65 is applied to one of the inputs of cube root device 67 and the output of gate 57, containing yield data information, is connected to the other input of cube root device 67. The output of cube root device 67 is applied to both the input of dose rate display device 69 and to the input of integration device 71. The output of integration device 71 is applied to the input of total dose display device 73. As the names imply, dose rate display device 69 shows the instantaneous dosage at any given time and the total dose display device 73 shows the accumulated dosage at any given time.

The operation of the circuit shown in FIG. 3 will now be described in reference to FIGS. 1 and 2. Referring to FIGS. 1 and 2 the initial signal (occuring at time $t_1$) is a digital command signal from master transmitter 11. This command signal ($f_{c0}$) from master transmitter 11 comprises a plurality of digital pulses where each pulse is made up from a high-frequency signal of, for example, 2 megacycles. This command signal ($f_{c0}$) is received by the high-frequency receiver section of receiver section 43 of receiver 15 of FIG. 3. The command signal at time $t_1$ is applied to the input of command logic device 45 and is coded so that command logic device 45 will cause gate 53 to open and gates 54, 55 and 56 to remain closed. It will be understood by those skilled in the art that the output of command logic device 45 may be of many different forms. For example, it may be a coded output that is simultaneously applied to all of the gates and opens or closes the gates depending upon the particular code. Alternatively, it may send an output signal only to the gate that is to be opened where the gates are in the closed position (normally closed) when they receive no signal from command logic device 45.

Gate 53 which was opened by the command signal during time $t_1$ will remain open until the expiration of time $t_2$. At time $t_3$ a different coded command signal will be received which will open gate 55 (during times $t_3$ and $t$) and will close all of the other gates, including gate 53, during this time. At time $t_5$ another coded command signal will be received which will open gate 54 during times $t_5$ and $t_6$ and will close all of the other gates including gate 55. At time $t_7$ still another coded command signal will be received which will open gate 56 and will close all of the other gates including gate 55. The yield data may be communicated to receiver 15 during any of the time periods $t_1$ through $t_8$ and gate 57 may be opened at any appropriate time. When this yield data communication is done depends upon the particular types of circuits employed in command logic device 45, yield data detection device 59, gate 57 and cube root device 67 and how often the yield data changes as a function of time. For example, the yield data may be included in the code command signal during time $t_1$ where it is then immediately transmitted to yield data detection device 59 which then transmits this data through gate 57 (which is also opened by this command signal) to cube root device 67 where it is then stored (by setting a series of flip-flop circuitry, for example) from time $t_1$ through time $t_8$. If the yield data remains the same during cycles 1 and 2 or 3 or more cycles, then no new yield data command signal need be sent provided the original yield data remains stored in cube root device 67. Since the yield data is used only at the end of cycle it may be sent in the command signal during time $t_7$ or it may be sent during a separate time frame which might be $t_9$, not shown, added to the end of each cycle of operation.

As previously explained, during time $t_2$ gate 53 is open and the other gates are closed. During time $t_2$ master transmitter 11 transmits a simulation signal ($f_m$) at a carrier frequency ($f_c$) of 200 kc., for example, and at a modulation frequency ($f_1$) of 1.5 kc., for example, as determined by control computer 23 and the digital command signal received by master transmitter 11 during time $t_1$. This simulation signal ($f_m$) is filtered by filter 47 which is then applied to the input of memory oscillator 39 through gate 53 which is open during time $t_2$. Memory oscillator 39 oscillates at 1.5 kc. at a time reference determined by control computer 23. The output of memory oscillator 39 is continuously applied to one of the inputs of phase detector 61. This signal is shown in FIG. 2 during cycle 1 (and is repeated during cycles 2, 3 to $n$), time $t_2$, during the $f_1$=1.5 kc. transmissions.

During time $t_4$, gate 55 is open and the other gates are closed. During time $t_4$ slave transmitter 12 ($S_1$) transmits a simulation signal ($f_{s_1}$) at a carrier frequency ($f_c$) of 200 kc., for example, and at a modulation frequency ($f_1$) of 1.5 kc., for example, as determined by control computer 23 and the digital command signal received by slave transmitter 12 during time $t_3$. This simulation signal ($f_{s_1}$) is filtered by filter 49 which is then applied to the input of memory oscillator 41 through gate 55 which is open during time $t_4$. Memory oscillator 41 oscillates at 1.5 kc. at a time reference determined by control computer 23. The output of memory oscillator 41 is continuously applied to one of the inputs of phase detector 63. This signal is shown in FIG. 2 during cycle 1 (and is repeated during cycles 2, 3 to $n$), time $t_4$, during the $f_1$=1.5 kc. transmissions.

During time $t_6$, gate 54 is opened and the other gates are closed. During time $t_6$ slave transmitter 13 ($S_2$) transmits a simulation signal ($f_{s_2}$) at a carrier frequency ($f_c$) of 200 kc., for example, as determined by control computer 23 and the digital command signal received by slave transmitter 13 during time $t_5$. This simulation signal ($f_{s_2}$) is filtered by filter 48 (where the carrier frequency is removed) which is then applied to the input of phase detector 61 through gate 54 which is open during time $t_6$. The phase relationship of simulation signal $f_{s_2}$ with respect to the simulation signal $f_m$ is determined by control computer 23 and by the position of the receiver in the grid network. The phase of simulation signal $f_{s_2}$ may lead or lag or be the same as the phase of the simulation signal $f_m$ which is being retained or stored in memory oscillator 39. In FIG. 2 the phase of simulation signal $f_{s_2}$ (solid line) is shown as lagging by an amount $p_1$ the simulation signal $f_m$ (dotted line) that is stored in memory oscillator 39. Phase detector 61 will detect the out of phase relationship $p_1$ between the $f_m$ and $f_{s_2}$ simulation signals which contains rectangular coordinate X-direction information and is used in device 65 to obtain polar coordinate R-information. In accordance with the FIG. 3 embodiment of receiver 15 the X-information from phase detector 61 is transmitted to device 65 during time $t_6$ and is retained in device 65 until after it has been compared with the Y-information from phase detector 63.

During time $t_8$, gate 56 is opened and the other gates are closed. During time $t_8$ slave transmitter 14 transmits a simulation signal ($f_{s_3}$) at a carrier frequency ($f_c$) of 200 kc. for example, and at a modulation frequency ($f_1$) of 1.5 kc. for example, as determined by control computer 23 and the digital command signal received by slave transmitter 14 during time $t_7$. This simulation signal ($f_{s_3}$) is filtered by filter 50 (where the carrier frequency is removed) which is then applied to the input of phase detector 63 through gate 56 which is open during time $t_8$. The phase relationship of simulation signal $f_{s_3}$ with respect to the simulation signal $f_{s_1}$ is determined by control computer 23 and by the position of the receiver in the grid network. The phase of simulation signal $f_{s_3}$ may lead or lag or be the same as the phase of the simulation signal $f_{s_1}$ which is being retained or stored in memory oscillator 41. In FIG. 2 the phase of simulation signal $f_{s_3}$ (solid line) is shown as lagging by an amount $p_2$ the simulation signal $f_{s_1}$ (dotted line) that is stored in memory oscillator 41. Phase detector 63 will detect the out of phase relationship $p_2$ between the $f_{s_1}$ and $f_{s_3}$ simulation signals which contain rectangular coordinate Y direction information and is used in device 65 to obtain polar coordinate R-information. The Y-information from phase detector 63 is transmitted to device 65 during time $t_8$ where it is combined with the X-information that was received during the time $t_6$ but was retained by a memory device in device 65 as previously described.

The above-described simulation at the 1.5 kc. modulation frequency may be then repeated during cycles 2 and 3 and for $n$ cycles, as necessary, where $p_1$ and $p_2$ would remain constant. A similar process is then repeated for the $f_2$=8.0 kc. and the $f_3$=15.0 kc. transmissions.

Knowing the polar coordinate distance information R and the yield information Yi and other information, such as wind direction, etc., the instantaneous dose is provided at the output of cube root device 67 and is then applied to the input of dose rate display 69 and integration device 71 the output of which is displayed on total dose display 73.

It has been found that many different modulation frequencies may be employed. For example, a system very effective over a 50-by-50 mile area has been developed where $f_1$=930 cycles, $f_2$=6.4 kc. and $f_3$=43.6 kc. It has also been found that a carrier frequency of 225 kc. has been effective to transmitting the digital control signals.

Obviously many modifications and variations of the present invention are possible in the light of the above teachings. It is therefore to be understood that within the scope of the appended claims the invention may be practiced otherwise than as specifically described.

We claim:
1. A receiver for processing frequency modulated carrier signals having first, second, third and fourth modulation frequency signals comprising:
   a. a receiver section
   b. first and second memory oscillators;
   c. first and second phase detectors;
   d. a filter device;
   e. said filter device connected to the output of said receiver section for rejecting the carrier signal and passing the modulation frequency signals of said frequency modulated carrier signals;
   f. means for selectively applying said first, second, third and fourth modulation frequency signals to said first and second memory oscillators and to said first and second phase detectors;
   g. said means applying said first modulation frequency signal to said first memory oscillator for being retained thereby;
   h. said means applying said second modulation frequency signal to said first phase detector;
   i. said means applying said third modulation frequency signal to said second memory oscillator for being retained thereby;
   j. said means applying said fourth modulation frequency signal to said second phase detector;
   k. the output of said first memory oscillator being applied to said first phase detector for comparison with said second modulation frequency signal; and
   l. the output of said second memory oscillator being applied to said second phase detector for comparison with said fourth modulation frequency signal.

2. The device of claim 1 wherein:
   a. said frequency modulated carrier signals including control signals;
   b. the output of said receiver section is connected to the input of a command logic device for responding to said control signals; and
   c. the output of said command logic device being connected to a plurality of gates for selectively controlling the application of said first, second, third, and fourth modulation frequency signals to said first and second memory oscillators and to said first and second phase detectors.

3. The device of claim 9 wherein:
   a. said frequency modulated carrier signals including signals containing radiation parameter information;
   b. said command logic device responding to said signals containing radiation parameter information;
   c. a device for processing said signals containing radiation parameter information; and
   d. means for applying said signals containing radiation parameter information to said command logic device.

* * * * *